United States Patent [19]
Sekine et al.

[11] Patent Number: 6,029,635
[45] Date of Patent: Feb. 29, 2000

[54] FUEL VAPOR EMISSION PREVENTING SYSTEM

[75] Inventors: Hidetoshi Sekine; Katsuyuki Ichinohe; Yasufumi Suzuki; Yoshiaki Oyamada; Naoki Hosoya, all of Tokyo, Japan

[73] Assignee: Fuji Jukogyo Kabushiki Kaisha, Tokyo, Japan

[21] Appl. No.: 09/137,965

[22] Filed: Aug. 21, 1998

[30] Foreign Application Priority Data

Aug. 29, 1997 [JP] Japan ................................ 9-233770

[51] Int. Cl.[7] ................................................. F02M 37/04
[52] U.S. Cl. ........................ 123/516; 123/520; 220/86.2; 137/587
[58] Field of Search .................................... 123/520, 516, 123/519, 518, 521, 198 D; 137/587; 220/86.1, 86.2

[56] References Cited

U.S. PATENT DOCUMENTS

| | | | |
|---|---|---|---|
| 5,579,742 | 12/1996 | Yamazaki | 123/520 |
| 5,647,334 | 7/1997 | Miller | 123/520 |
| 5,769,057 | 6/1998 | Hashimoto | 123/516 |
| 5,816,287 | 10/1998 | Hyodo | 123/519 |
| 5,870,997 | 2/1999 | Mukai | 123/516 |
| 5,906,189 | 5/1999 | Mukai | 123/516 |

*Primary Examiner*—Carl S. Miller
*Attorney, Agent, or Firm*—Martin A. Farber

[57] ABSTRACT

A communicating pipe for introducing atmospheric pressure to an air vent circuit changeover valve has an intermediate portion provided in a fuel tank and slanted portions extending obliquely upward. The intermediate portion has a drain pipe wherein a drain hole is provided. Liquefied fuel in the communicating pipe is gathered to the intermediate portion through the slanted portions and drained from the drain pipe into the fuel tank. Thus constituted communicating pipe prevents a clogging of liquefied fuel in the communicating pipe.

18 Claims, 8 Drawing Sheets

FUEL VAPOR EMISSION PREVENTING SYSTEM

BACKGROUND OF THE INVENTION

1. Field of the Invention

The present invention relates to a system for controlling fuel vapor produced from the fuel tank, more particularly to a system for preventing the fuel vapor from being emitted to the atmosphere when the vehicle is refueled.

2. Description of the Prior Art

Automobiles emit various toxic matters such as carbon-monoxide (CO), nitrogenoxides (NOx), hydrocarbons (HC) and the like. Among those toxic matters, in recent years hydrocarbons, i.e., fuel vapor emitted from the fuel tank has come to public notice. It is said that the fuel vapor shares 25% of total hydrocarbons emitted from automobiles. The portion of fuel vapor generated when the vehicle is moving or stationary is called an evaporative emission. The control of the evaporative emission is a known technique which has been widely used in conventional vehicles.

On the other hand, the portion of fuel vapor which is generated when the vehicle is being refueled at a gas station is called a refueling vapor and it is emitted to the atmosphere during refueling through the fuel filler pipe unless controlled. The amount of the refueling vapor is almost equal to that of the fuel refueled. The inventor of the present invention proposes an apparatus for preventing the refueling vapor during refueling from being emitted outside the vehicle in Japanese Patent Application Laid-open No. Toku-Kai-Hei 8-258577.

FIG. 11 is a schematic diagram showing the construction of a fuel vapor emission preventing apparatus according to Toku-Kai-Hei 8-258577. The apparatus is constructed such that when a filler cap 21 is uncovered and then a fuel dispensing nozzle is placed in a filler pipe 20 to supply fuel to a fuel tank 10, the fuel dispensing nozzle guided by a restrictor 22 turns a shutter 23 to operate an air breather circuit changeover valve 63. This operation causes a shut-down of an air breather circuit 60 extending from the fuel tank 10 to a canister 30 through a fuel cut-off valve 61, a pipe 62, the air breather circuit changeover valve 63, a pressure control valve 64 and a roll-over valve 65 so as to prevent an over-filling.

The fuel vapor produced in the fuel tank 10 during refueling is guided through a pipe 74 to an air vent circuit changeover valve 72. Then, if the pressure in the fuel tank 10 is larger than the atmospheric pressure which is supplied through a pipe 73, the air vent circuit changeover valve 72 opens to guide the fuel vapor to the canister 30 wherein the fuel vapor is adsorbed.

However, the fuel vapor emission preventing apparatus of the prior art has such a disadvantage that if the pipe 73 is clogged by liquefied fuel vapor, the air vent circuit changeover valve 72 may not open successfully and this results in hindering refueling the fuel tank 10 due to an increased resistance of the air vent circuit changeover valve 72.

SUMMARY OF THE INVENTION

With the above described problem in mind, it is a primary object of the present invention to provide a fuel vapor emission preventing system wherein the pipe for introducing atmospheric pressure to the air vent circuit changeover valve is free from clogging by liquefied fuel.

The fuel vapor emission preventing system in accordance with the present invention is characterized in comprising a communicating pipe connected with the air vent circuit changeover valve, a first slanted pipe connected with the communicating pipe and extended obliquely downward to the fuel tank, an intermediate pipe connected with a lower end of the first slanted pipe and provided within the fuel tank, a drain pipe connected with the intermediate pipe and extended downward, a drain hole provided in the drain pipe, and a second slanted pipe connected at one end thereof with the intermediate pipe, extending obliquely upward and connected at the other end thereof with the fuel filler pipe.

BRIEF DESCRIPTION OF THE DRAWINGS

The object and the feature of the present invention will become more apparent from the following description taken in conjunction with the accompanying drawings which illustrate specific embodiments of the invention.

DETAILED DESCRIPTION OF PREFERRED EMBODIMENTS

Figure 1:
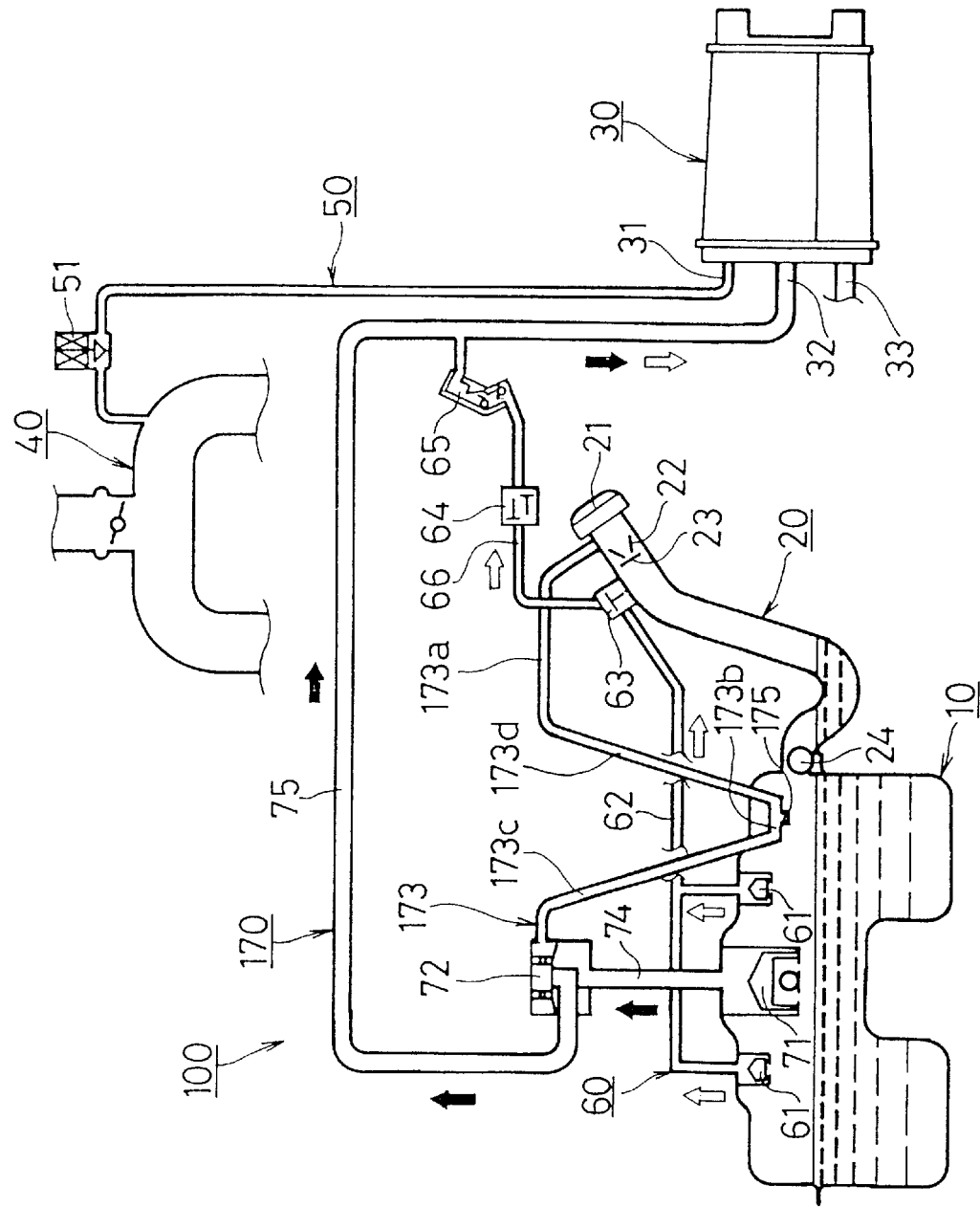
FIG. 1 is a schematic view of a fuel vapor emission preventing system according to a first embodiment of the present invention.
Figure 11:
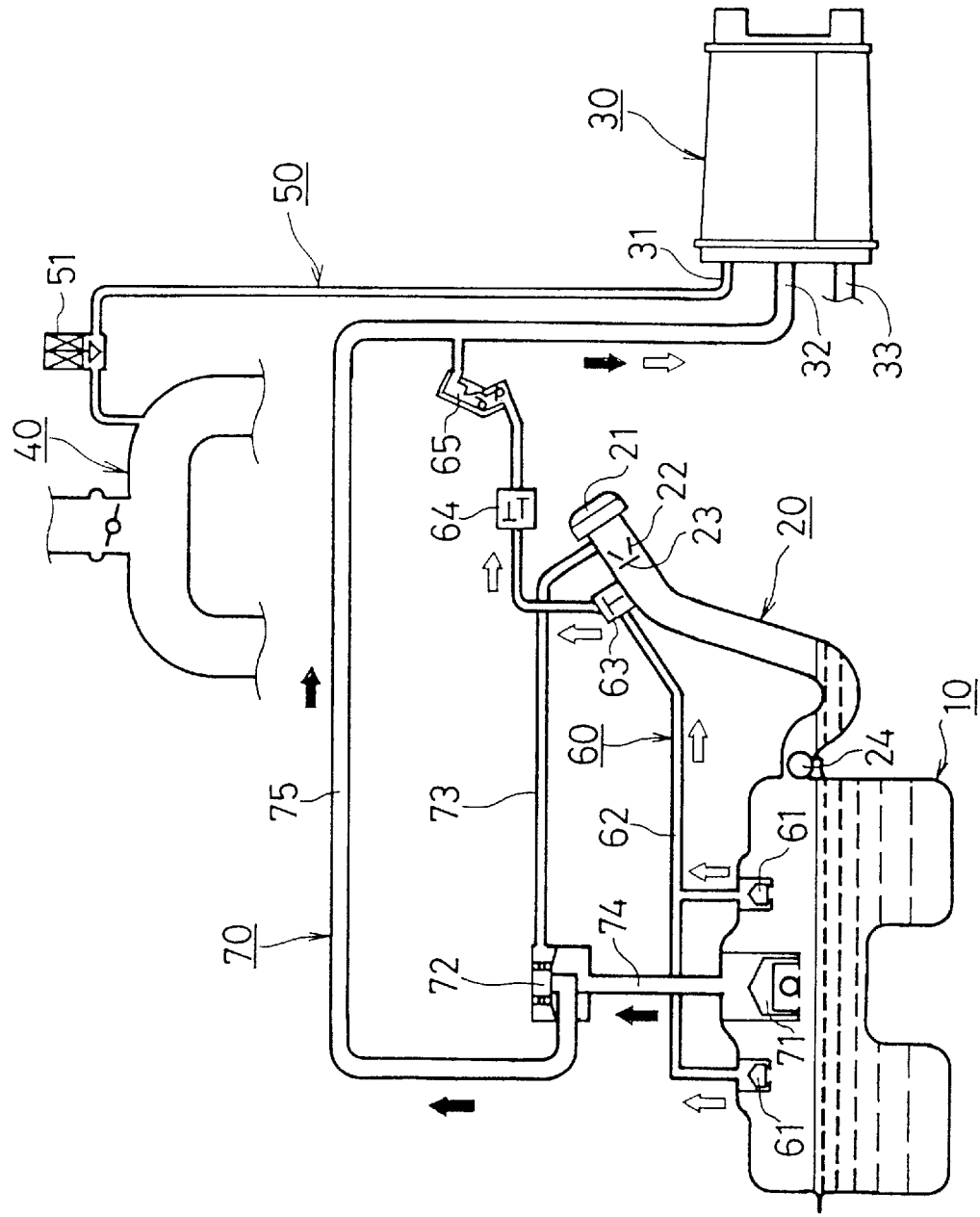
FIG. 11 is a schematic view of a fuel vapor emission preventing system described in Japanese Patent Application Laid-open No. Toku-Kai-Hei 8-258577.

Referring now to FIG. 1, a first embodiment of a fuel vapor emission preventing system 100 will be described in detail. Components identical to those shown in FIG. 11 are denoted by identical reference numerals.

As shown in FIG. 1, a fuel filler pipe 20 from which fuel is supplied to a fuel tank 10 is provided with a filler cap 21 for covering a filler neck, a restrictor 22 for guiding the fuel nozzle into the fuel filler pipe 20 and a shutter 23 pushed by the front end of the fuel nozzle to open and close. Further, the fuel filler pipe 20 is formed in U-shape at the lower end thereof to have a liquid-sealing function and is provided with a spit-back preventing valve 24 for preventing spit-back of fuel from the fuel tank 10 towards the fuel filler pipe 20.

A charcoal canister 30 for adsorbing fuel vapor is provided with a discharge port 31, an intake port 32 and a breathing port 33. The discharge port 31 communicates with an intake manifold 40 via a purge circuit 50 and a purge control valve 51. When the purge control valve 51 opens, the negative pressure in the intake manifold 40 sucks fuel vapor stored in the charcoal canister 30 into the intake manifold 40. The fuel vapor sucked into the intake manifold 40 is sent to the combustion chamber of the engine for burning.

The intake port 32 of the charcoal canister 30 is connected with an air breather circuit 60 for sending the fuel vapor generated in the fuel tank 10 except when refueling to the charcoal canister 30 and is also connected with an air vent circuit 170 for sending the fuel vapor generated in the fuel tank 10 when refueling to the charcoal canister 30.

The air breather circuit 60 is connected with the fuel tank 10 through a pair of fuel cut-off valves 61. Also the air breather circuit 60 is connected through a pipe 62 provided downstream of the fuel cut-off valves 61 with an air breather circuit changeover valve 63 provided at the upper portion of the fuel filler pipe 20. The air breather circuit changeover valve 63 is constituted to close when the shutter 23 is pushed up by the fuel nozzle on refueling. On a pipe 66 extended downstream of the air breather circuit changeover valve 63, there are provided with a pressure control valve 64 which is composed of a low pressure two way valve and further downstream of the pressure control valve 64 there is provided with a roll over valve 65 for preventing fuel from flowing outside when the vehicle turns over.

The air vent circuit 170 is connected with the fuel tank 10 through a filling-up restriction valve 71 for closing the air vent circuit 170 by buoyancy of a float inside when the fuel tank 10 is filled up and the filling-up restriction valve 71 is connected at the top portion thereof with a pipe 74. The pipe 74 extending upward is connected at the upper end thereof with an air vent changeover valve 72. The air vent changeover valve 72 has two chambers, an upper chamber and a lower chamber which are separated from each other with a diaphragm biased by a spring provided in the upper chamber. The upper chamber is connected with a communicating pipe 173 for introducing the atmospheric pressure thereto and the lower chamber is connected with the pipe 74 for introducing the pressure within the fuel tank 10.

Generally, fuel in the fuel tank 10 is heated by heat from the exhaust pipe or from the road surface to generate fuel vapor, i.e., evaporative emission. Thus generated evaporative emission, as indicated by white arrows in FIG. 1, is discharged through the fuel cut-off valve 61, the pipe 62, the air breather circuit changeover valve 63, the pressure control valve 64 and the roll-over valve 65 and is adsorbed to the charcoal canister 30. On the other hand, when the pressure of the fuel tank 10 becomes lower than that of the charcoal canister 30, the pressure control valve 64 opens towards the fuel tank side and allows to introduce the outside air into the fuel tank 10 through the breathing port 33 of the charcoal canister 30, thereby the pressure within the fuel tank 10 is kept substantially constant.

On the other hand, when the fuel nozzle is inserted to the fuel filler pipe 20 for refueling, the air breather circuit changeover valve 63 is closed in response to the rotation of the shutter 23 to shut the air breather circuit 60 off. With an increase of the fuel level by an increase of fuel supplied from the fuel nozzle, the pressure within the fuel tank 10 becomes high and as a result the pressure within the lower chamber of the air vent circuit changeover valve 72 becomes high. When the pressure within the fuel tank 10 becomes higher than the atmospheric pressure introduced into the upper chamber of the air vent circuit changeover valve 72 through the communicating pipe 173, the diaphragm is pushed upward against the spring force to open the air vent circuit changeover valve 72 and the fuel vapor in the fuel tank 10, as indicated by black arrows in FIG. 1, is sent to the charcoal canister 30 through the air vent circuit 170 and adsorbed therein.

The feature of the fuel vapor emission preventing system according to the first embodiment will be described.

Figure 2:
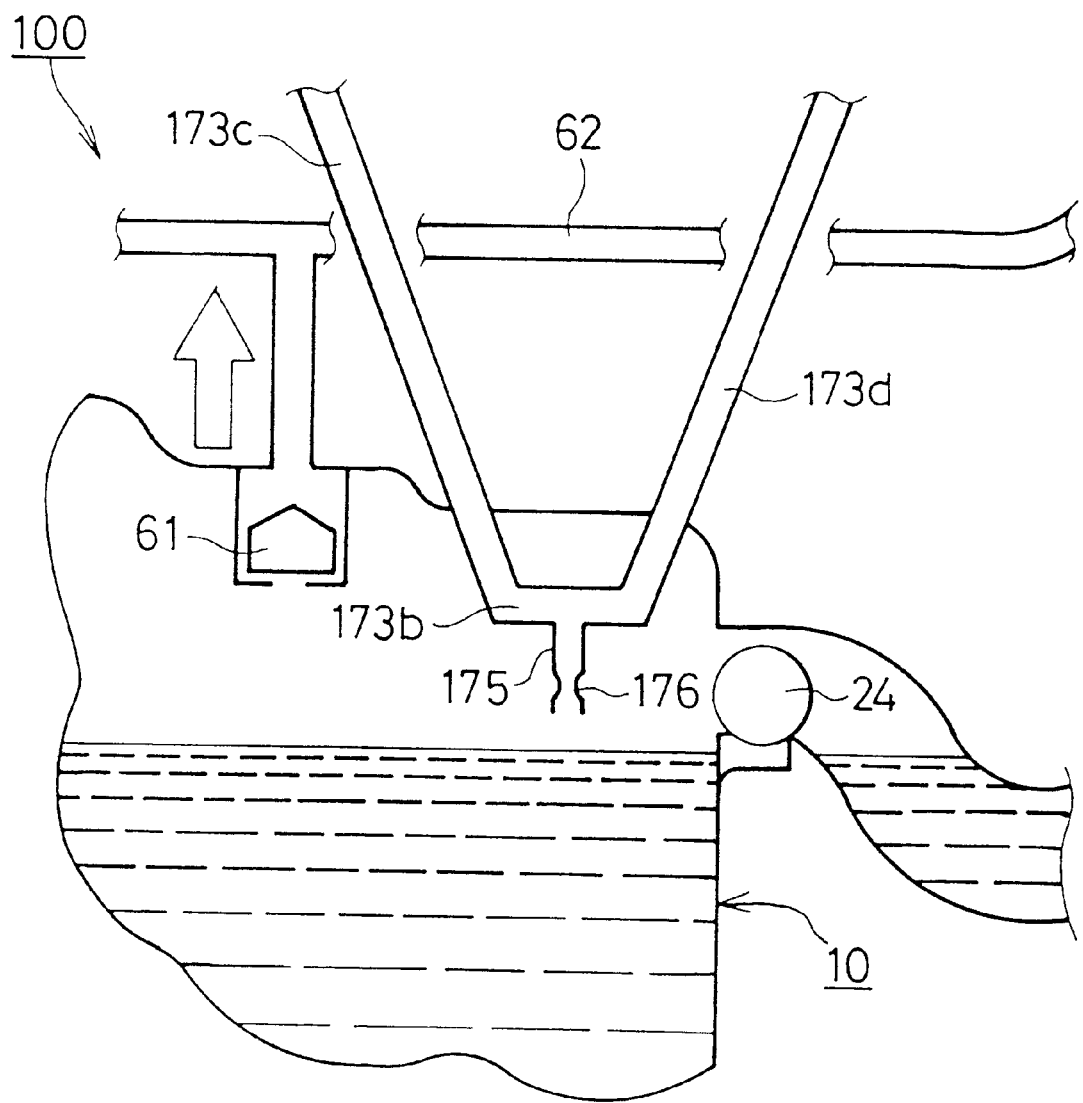
FIG. 2 is an enlarged partial view of the fuel vapor emission preventing system illustrated in FIG. 1.

The communicating pipe 173 is connected at a filler pipe connecting portion 173*a* thereof with the fuel filler pipe 20. The pipe 173 has an intermediate portion 173*b* which is accommodated within the fuel tank 10. Further, the intermediate portion 173*b* is connected at both ends thereof with slanted portions 173*c*, 173*d* respectively. The respective slanted portions 173*c*, 173*d* are projected outside of the fuel tank 10 with a specified gradient and connected with the air vent circuit changeover valve 72 and the filler pipe connecting portion 173*a*, respectively. As shown in FIG. 2, the intermediate portion 173*b* is connected at the mid point thereof with a drain pipe 175 extending downward. The drain pipe 175 includes an orifice 176 as a drain hole at the lower end thereof. The orifice 176 is located at a position as high as approximate 95% level of the nominal tank capacity of the fuel tank 10.

The fuel vapor liquefied within the communicating pipe 173 flows down through the slanted portions 173*c*, 173*d* towards the intermediate portion 173*b* and drops into the fuel tank 10 through the orifice 176. Therefore, the communicating pipe 173 is never clogged by the liquefied fuel vapor and this result in allowing the air vent circuit changeover valve 72 to open securely when refueling. The orifice 176 serves as restricting the pressure communication between the fuel tank 10 and the communicating pipe 173. That is, when the pressure within the fuel tank 10 is being increased by refueling, the pressure within the communicating pipe 173 rises very slowly and this does not adversely affect the normal operation of the air vent circuit changeover valve 72. The orifice 176 also serves as preventing fuel from easily entering into the communicating pipe 173. Further, since the orifice 176 is cleaned by fuel every time the fuel tank 10 is filled up, the orifice 176 is always free from clogging.

Besides, when refueling, a part of the fuel vapor within the fuel tank is sucked by the vacuum pressure around the fuel nozzle through the orifice 176 and is sent back to the fuel tank 10. This circulated fuel vapor saves the amount of fuel vapor to be loaded in the charcoal canister 30.

Figure 3:
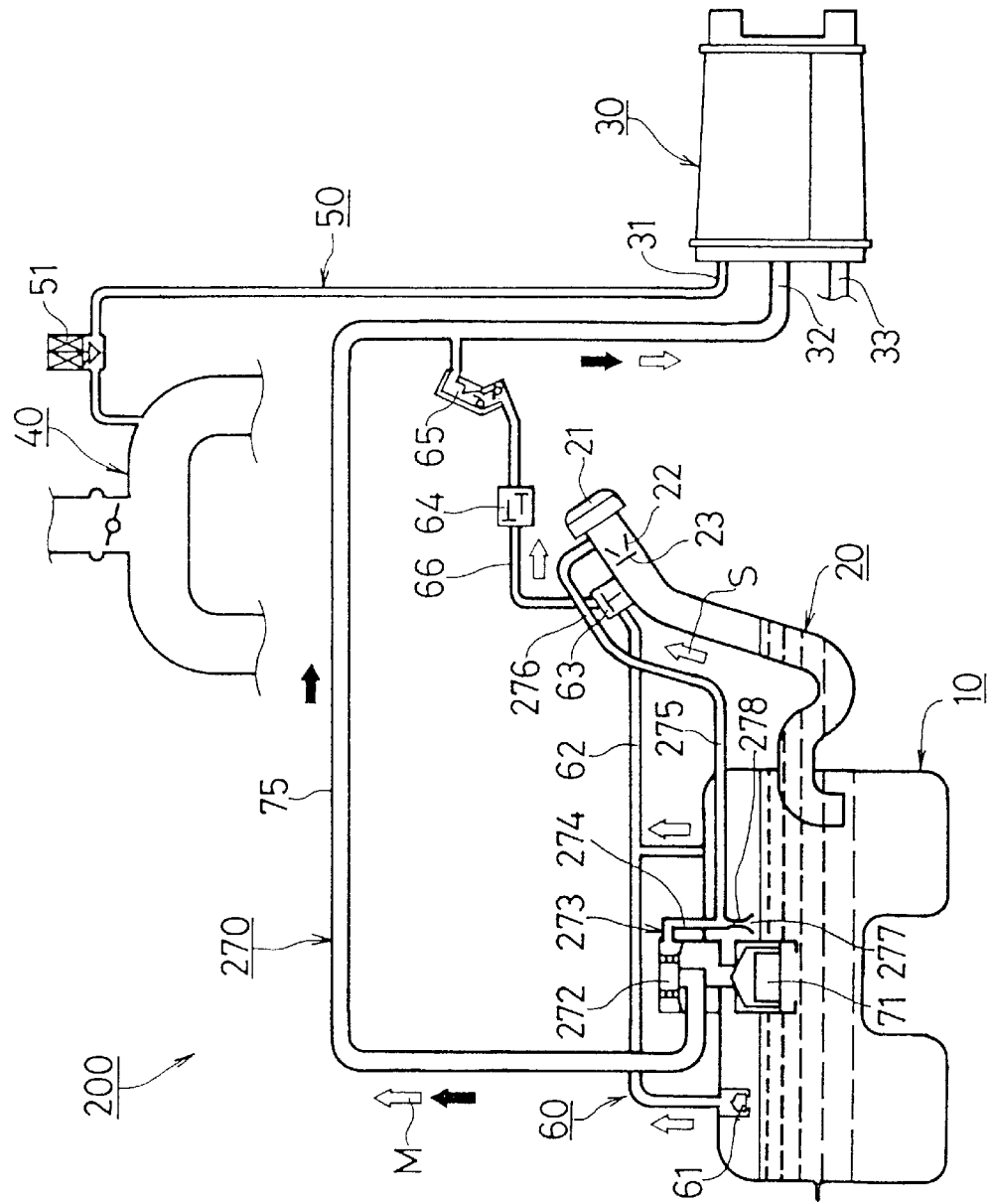
FIG. 3 is a schematic view of a fuel vapor emission preventing system according to a second embodiment of the present invention.

Next, the fuel vapor emission preventing system 200 according to a second embodiment will be described with reference to FIGS. 3 and 4. The components which are identical to those in the first embodiment are denoted by identical reference numerals and are not described hereinafter in detail.

The fuel vapor emission preventing system 200 according to the second embodiment differs from that according to the first embodiment in the construction of the air vent circuit 270.

Figure 4:
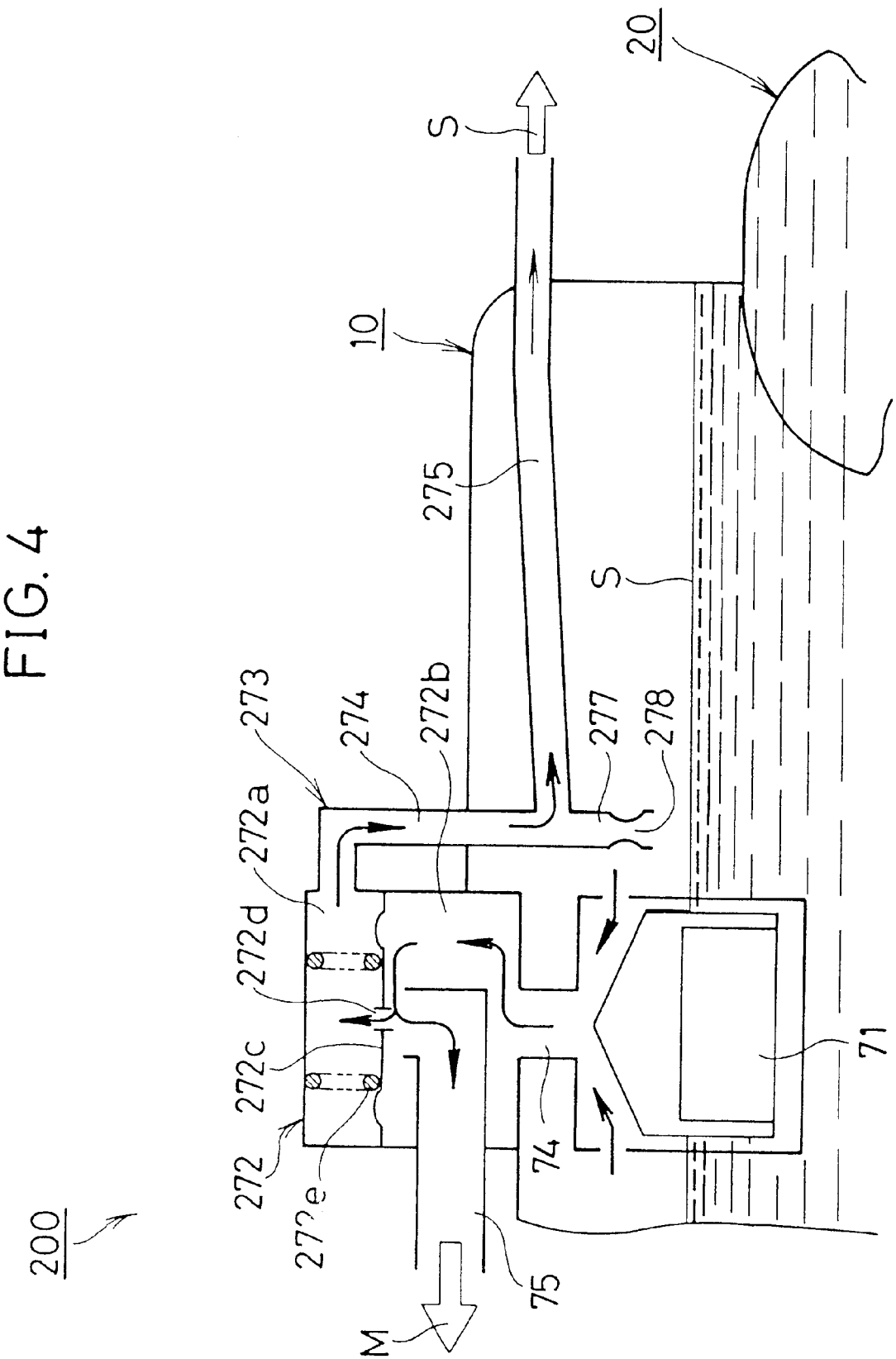
FIG. 4 is an enlarged partial view of the fuel vapor emission preventing system illustrated in FIG. 3.

As indicated in FIG. 4, a diaphragm 272*c* for partitioning between an upper chamber 272*a* and a lower chamber 272*b* of an air vent circuit changeover valve 272 is provided with an orifice 272*d* having a small diameter. Further, the upper chamber 272*a* of the air vent circuit changeover valve 272 is connected with a communicating pipe 273 for introducing atmospheric pressure. Further, the upper chamber 272*a* is connected, immediately downstream of the connecting portion of the upper chamber 272*a* and the communicating pipe 273, with a vertical portion 274 extending downward into the fuel tank 10 and the vertical portion 274 has an orifice 278 adjacent to an open vent 277 provided at the lower end thereof. Further, the vertical portion 274 is connected midway in the fuel tank 10 with a first rising portion 275 which rises gradually upward. The rising portion 275 is connected outside of the fuel tank 10 with a second rising portion 276 which rises steeply upward and is connected at the upper end thereof with the upper portion of the fuel filler pipe 20.

Describing an operation of the air vent circuit 270 according to the second embodiment, when the pressure within the fuel tank 10 rises as an increase of the fuel level accompanying with refueling, the pressure within the lower chamber 272b of the air vent circuit changeover valve 272 rises and the diaphragm 272c is pushed upward against a spring 272e. As a result, as shown in FIG. 4, greater part of the fuel vapor within the fuel tank 10 enters into a pipe 75 of the air vent circuit 270 through the filling-up restriction valve 71 and the pipe 74 and is sent to the charcoal canister 30 as indicated by arrows M in FIGS. 3 and 4.

At this moment, a part of the fuel vapor within the lower chamber 272b of the air vent circuit changeover valve 272 flows through the orifice 272d provided on the diaphragm 272c into the upper chamber 272a. The fuel vapor let in the upper chamber 272a, as indicated by arrows S in FIGS. 3 and 4, is guided to the fuel filler pipe 20 and sucked therefrom by the vacuum pressure around the fuel nozzle into the fuel tank 10 again.

The fuel vapor liquefied in the communicating pipe 273 flows down the second rising portion 276 and the first rising portion 275 and reaches the vertical portion 274, then dropping through the orifice 278 and the open vent 277 into the fuel tank 10. As a result of this, the communicating pipe 273 never clogs with the liquefied fuel vapor. Further, since the orifice 278 is located at a position corresponding to a 95% to 100% level of the nominal tank capacity, the orifice 278 is cleaned by fuel every time the fuel tank 10 is filled up. Therefore, there is no fear that the orifice 278 causes clogging due to stain.

Further, since the orifice 278 is located near a fill-up level of the fuel tank 10, in most cases of refueling, the orifice 278 is above the fuel level. Therefore, a part of fuel vapor is sent to the upper portion of the fuel filler pipe 20 through the orifice 278 and the communicating pipe 273 being sucked by the vacuum pressure around the fuel nozzle and fed back again into the fuel tank 10 at the filler neck. This fuel vapor sucked at the upper portion of the fuel filler pipe 20 saves the amount of fuel vapor sent to the charcoal canister 30, thereby the capacity of the charcoal canister can be reduced and this leads to down-sizing of the charcoal canister 30.

According to the fuel vapor emission preventing system 200 of the second embodiment, since the communicating pipe 273 is prevented from clogging due to the liquefied fuel vapor, the atmospheric pressure can be securely introduced into the upper chamber 272a of the air vent circuit changeover valve 272. Therefore, there is no problem such as the refueling performance is exacerbated due to the inoperative air vent circuit changeover valve 272 when refueling.

Next, a fuel vapor emission preventing system 310 according to a third embodiment will be described with reference to FIGS. 5 and 6.

In the aforesaid second embodiment, the liquefied fuel in the communicating pipe 273 is discharged into the fuel tank 10 through the orifice 278 provided in the vertical portion 274. Whereas, the feature of the third embodiment is to provide an orifice 311 at the side wall of the vertical portion 374 of the communicating pipe 373 and a check valve 312 at the lower end thereof.

The check valve 312 is fabricated of a one-piece molded rubber member. The check valve 312 comprises a cylindrical fitting portion 313 for fitting the valve body to the vertical portion 374 of the communicating pipe 373, a tapered portion 314 extended from the fitting portion 313 for closing the lower end of the vertical portion 374, a projected portion 315 projected downward from the tapered portion 314 and a slit 316 provided in the projected portion 315 and capable of opening and closing.

Figure 5:
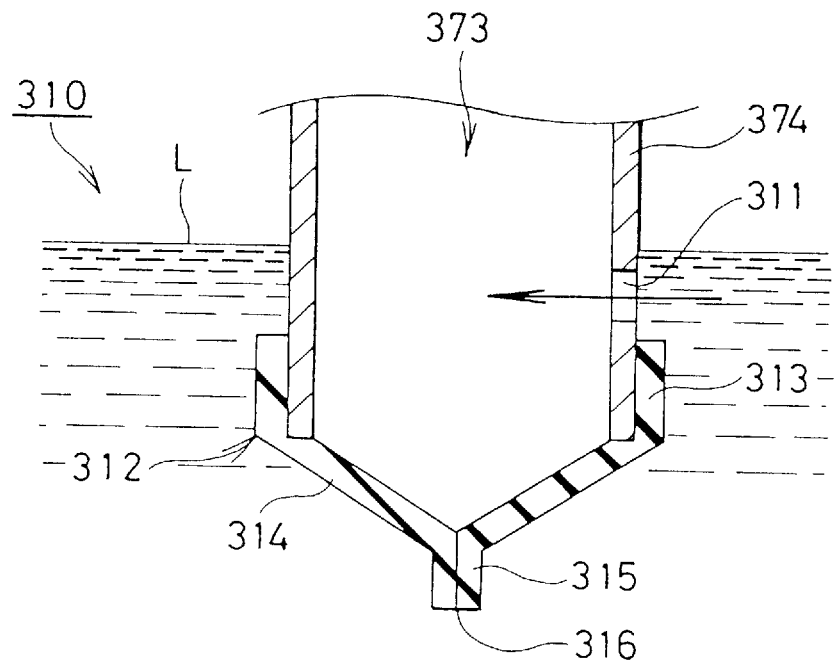
FIG. 5 is an enlarged view of a portion of a fuel vapor emission preventing system according to a third embodiment of the present invention.

When the fuel level L goes up on refueling and the check valve 312 is dipped in fuel, as shown in FIG. 5, the check valve 312 is closed by the head of fuel automatically. Therefore, there is no entry of fuel from the slit 316 to the communicating pipe 373. When the fuel level goes up further, fuel comes from the orifice 311 into the communicating pipe 373 to wash foreign matters away.

Figure 6:
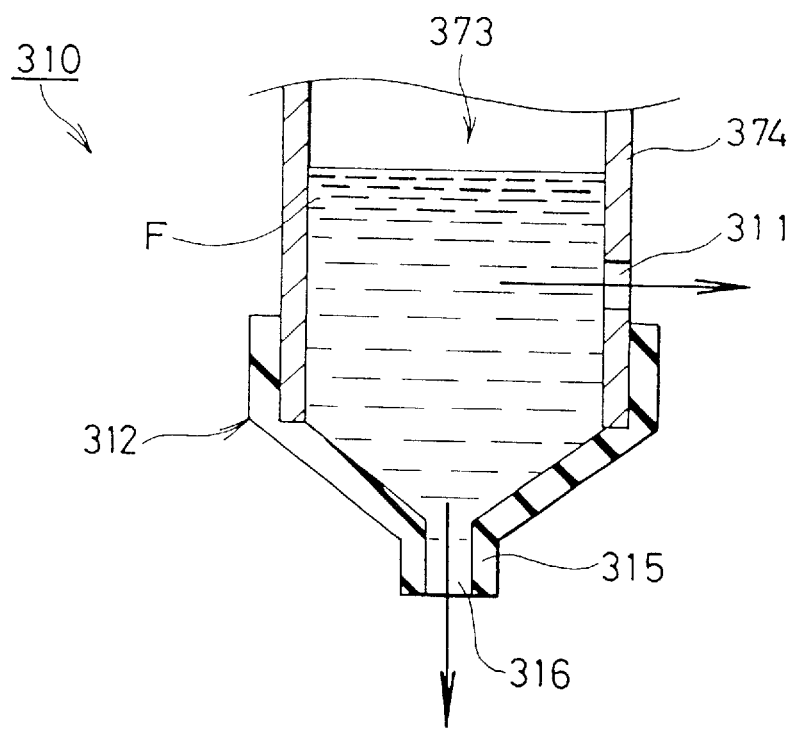
FIG. 6 is an explanatory view showing an operation of the portion illustrated in FIG. 5.

On the other hand, as shown in FIG. 6, when the fuel level L goes down and the head applied to the check valve 312 is released, the slit 316 of the check valve 312 is let open by the weight of the fuel F gathered in the communicating pipe 373 to drain fuel to the fuel tank. At this time, since the opening area of the slit 316 is larger than that of the orifice 311, foreign matters are discharged through the slit 316, thereby the orifice 311 can be prevented from being clogged by dusts mixed in fuel and the like.

Next, a fuel vapor emission preventing system 400 according to a fourth embodiment will be described with reference to FIGS. 7 and 8. The fuel vapor emission preventing system 400 is a system modified in the construction of the check valve according to the third embodiment. The check valve 412 comprises a hinge 413 provided at the lower end of the vertical potion 374 of the communicating pipe 373, a plate-like valve body 414 swinging around the hinge 413 for opening and closing, a spring (not shown) for biasing so as to hold the valve body 414 in the closing condition and a seal member 415 provided at the lower end of the vertical portion 374 for sealing the gap between the valve body 414 and the lower end of the vertical portion 374.

Figure 7:
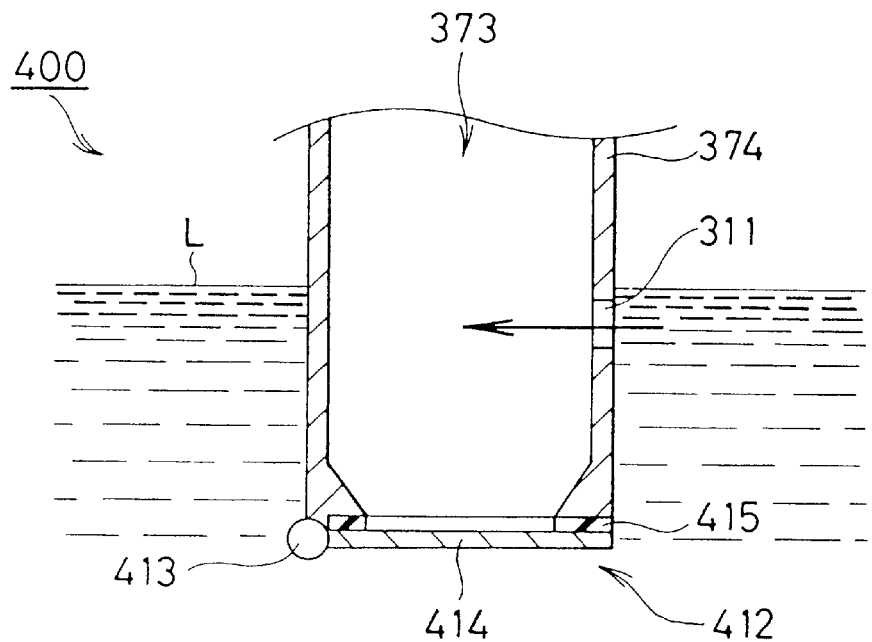
FIG. 7 is an enlarged view of a portion of a fuel vapor emission preventing system according to a fourth embodiment of the present invention.

When the fuel level L goes up on refueling, as shown in FIG. 7, the check valve 412 is urged in the closing condition by the biasing force of the spring and the head of fuel. When the fuel level L further goes up, fuel flows into the communicating pipe 373 through the orifice 311 to clean inside, thereby the orifice 311 being prevented from clogging.

Figure 8:
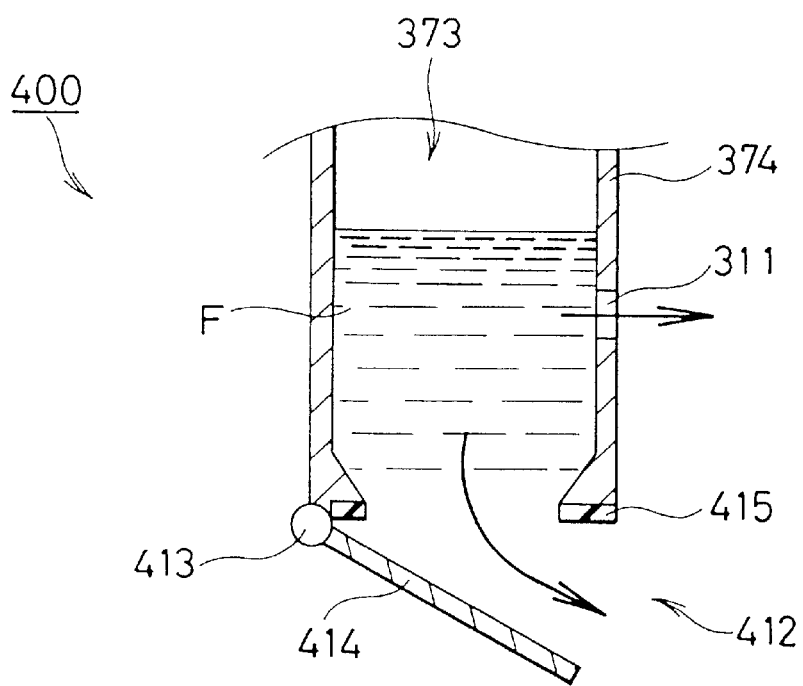
FIG. 8 is an explanatory view showing an operation of the portion illustrated in FIG. 7.

On the other hand, when the fuel level L goes down to deactivate the head of fuel, as shown in FIG. 8, the valve body 414 of the check valve 412 is let open by the weight of the fuel gathered in the communicating pipe 373. As a result, the fuel within the communicating pipe 373 is drained from the lower end of the communicating pipe 373 into the fuel tank 10.

Next, a fuel vapor emission preventing system 500 according to a fifth embodiment will be described with reference to FIGS. 9 and 10. The fuel vapor emission preventing system 500 is a system further modified in the construction of the check valve shown in the third and fourth embodiments.

Figure 9:
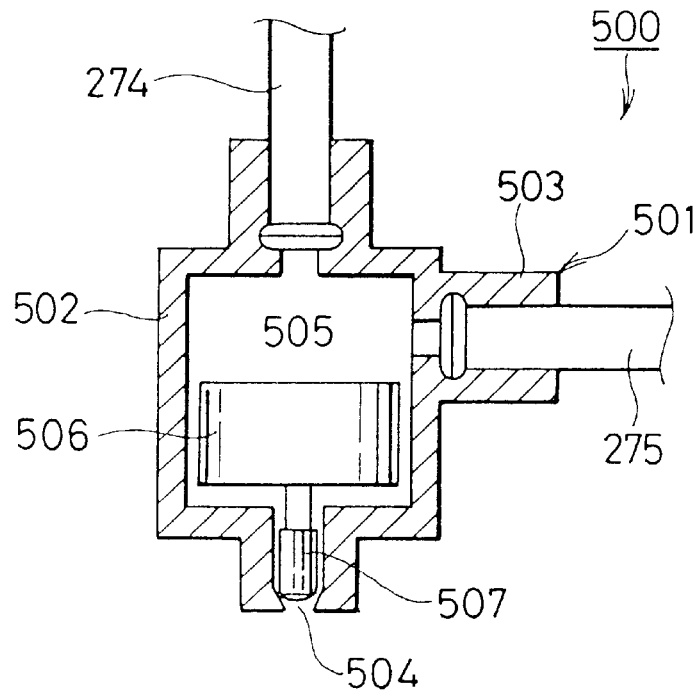
FIG. 9 is an enlarged view of a portion of a fuel vapor emission preventing system according to a fifth embodiment of the present invention.
Figure 10:
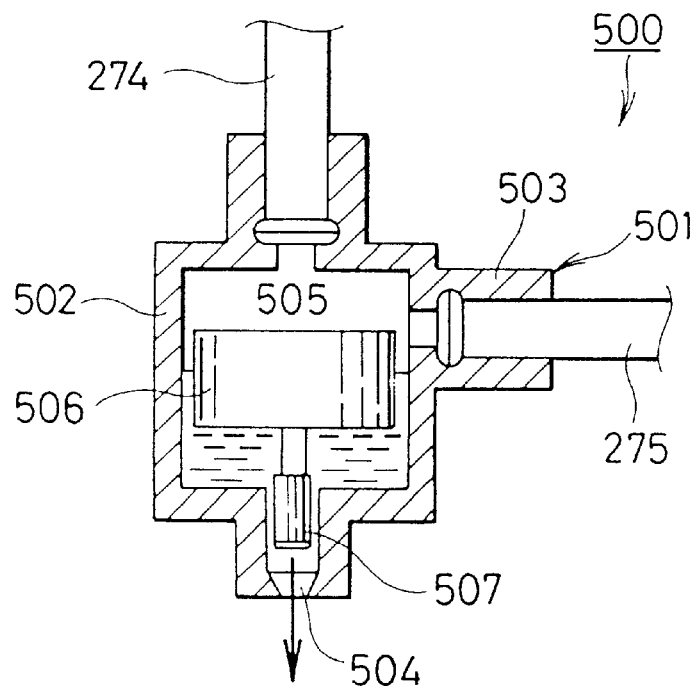
FIG. 10 is an explanatory view showing an operation of the portion illustrated in FIG. 9.

As illustrated in FIG. 9, a check valve 501 comprises a cylindrical vertical portion 502 coupled with the vertical portion 274 of the communicating pipe 273 and a cylindrical horizontal portion 503 projected from the vertical portion 502 in the horizontal direction. The vertical portion 502 has a cylinder portion 505 with a large diameter and an open vent 504 at the lower end thereof communicated with the fuel tank 10. Further, a valve body 507 connected at the upper portion thereof with a float 506 is slidably fit to the open vent 504 so as to open and close the open vent 504.

Describing an operation of the check valve 501 according to the fifth embodiment, when there is no liquefied fuel vapor inside of the check valve 501 as shown in FIG. 9, the open vent 504 is closed by the weight of the valve body 507 and the float 506. Meanwhile, when the liquefied fuel vapor is accumulated in the check valve 501 to lift the float 506 by buoyancy and the valve body 507 moves upward to open, the fuel accumulated in the check valve 501 is returned through the open vent 504 to the fuel tank.

According to the fuel vapor emission preventing system 500 of the fifth embodiment, the liquefied fuel vapor can be securely removed from the communicating pipe 273 and this ensures a safe operation of the air vent circuit changeover valve 272.

In summary, according to the fuel vapor emission preventing system of the present invention, the fuel vapor liquefied in the communicating pipe goes down the inclined portion of the communicating pipe and reaches the intermediate portion thereof provided in the fuel tank. The liquefied fuel vapor is discharged into the fuel tank from the drain hole provided in the intermediate portion. Thus, the communicating pipe is always free from the liquefied fuel vapor and therefore there is no such problem that the air vent changeover valve is not operated or imperfectly operated because of the clogging in the communicating pipe.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. Fuel vapor emission preventing system for a vehicle having a fuel tank, a fuel filler pipe, a charcoal canister for adsorbing a fuel vapor generated when refueling, an air vent circuit for feeding said fuel vapor to said charcoal canister, comprising:
    an air vent circuit changeover valve provided in said air vent circuit for changing over from the closed position to the open position so as to feed said fuel vapor to said charcoal canister when the pressure within said fuel tank is higher than atmospheric pressure;
    a communicating pipe connected with said air vent circuit changeover valve for introducing atmospheric pressure into said air vent circuit changeover valve;
    a first slanted pipe connected with said communicating pipe and extended obliquely downward to said fuel tank;
    an intermediate pipe connected with a lower end of said first slanted pipe and provided within said fuel tank;
    a drain pipe connected with said intermediate pipe and extended downward;
    a drain hole provided in said drain pipe;
    a filler pipe connecting pipe connected with said fuel filler pipe for introducing atmospheric pressure; and
    a second slanted pipe connected at one end thereof with said intermediate pipe, extending obliquely upward and connected at the other end thereof with said filler pipe connecting pipe.

2. The fuel vapor emission preventing system according to claim 1, wherein
    said drain hole is located at a position near a fill-up fuel level of said fuel tank.

3. The fuel vapor emission preventing system according to claim 1, wherein
    said drain hole is located at a position slightly lower than a fill-up fuel level of said fuel tank.

4. The fuel vapor emission preventing system according to claim 1, wherein
    said drain hole is provided with an orifice.

5. Fuel vapor emission preventing system for a vehicle having a fuel tank, a fuel filler pipe, a charcoal canister for adsorbing a fuel vapor generated when refueling, an air vent circuit for feeding said fuel vapor to said charcoal canister, comprising:
    an air vent circuit changeover valve provided in said air vent circuit for changing over from the closed position to the open position so as to feed said fuel vapor to said charcoal canister when the pressure within said fuel tank is higher than atmospheric pressure;
    a communicating pipe connected with said air vent circuit changeover valve for introducing atmospheric pressure into said air vent circuit changeover valve;
    a vertical pipe connected with said communicating pipe;
    a filler pipe connecting pipe connected with said filler pipe;
    a third slanted pipe connected at one end thereof with a mid-way portion of said vertical pipe, extending obliquely upward and connected at the other end thereof with said filler pipe connecting pipe for introducing atmospheric pressure; and
    a drain hole provided at the lower end of said vertical pipe.

6. The fuel vapor emission preventing system according to claim 5, wherein
    said drain hole is located at a position near a fill-up fuel level of said fuel tank.

7. The fuel vapor emission preventing system according to claim 5, wherein
    said drain hole is located at a position slightly lower than a fill-up fuel level of said fuel tank.

8. The fuel vapor emission preventing system according to claim 5, wherein
    said drain hole is provided with an orifice.

9. The fuel vapor emission preventing system according to claim 1, wherein
    said air vent circuit changeover valve includes a lower chamber for introducing said fuel vapor, an upper chamber for introducing atmospheric pressure and a diaphragm for separating said lower chamber and said upper chamber.

10. The fuel vapor emission preventing system according to claim 9, wherein
    said diaphragm is provided with a communicating hole for communicating between said lower chamber and said upper chamber.

11. The fuel vapor emission preventing system according to claim 5, wherein
    said air vent circuit changeover valve includes a lower chamber for introducing said fuel vapor, an upper chamber for introducing atmospheric pressure and a diaphragm for separating said lower chamber and said upper chamber.

12. The fuel vapor emission preventing system according to claim 11, wherein
    said diaphragm is provided with a communicating hole for communicating between said lower chamber and said upper chamber.

13. The fuel vapor emission preventing system according to claim 1, wherein
said drain hole is provided with a check valve capable of blocking an entry of fuel in said fuel tank to said communicating pipe and allowing to discharge fuel in said communicating pipe.

14. The fuel vapor emission preventing system according to claim 5, wherein
said drain hole is provided with a check valve capable of blocking an entry of fuel in said fuel tank to said communicating pipe and allowing to discharge fuel in said communicating pipe.

15. The fuel vapor emission preventing system according to claim 1, wherein
said drain hole is provided with a valve opening and closing means for opening said drain hole by buoyancy of a float when fuel comes in and for closing said drain hole by the weight of said float when fuel goes out.

16. The fuel vapor emission preventing system according to claim 5, wherein
said drain hole is provided with a valve opening and closing means for opening said drain hole by buoyancy of a float when fuel comes in and for closing said drain hole by the weight of said float when fuel goes out.

17. The fuel vapor emission preventing system according to claim 1, wherein
said fuel filler pipe is connected with said filler pipe connecting pipe at a position adjacent to the inlet thereof so as to introduce vacuum during refueling.

18. The fuel vapor emission preventing system according to claim 5, wherein
said fuel filler pipe is connected with said filler pipe connecting pipe at a position adjacent to the inlet thereof so as to introduce vacuum during refueling.

* * * * *